Oct. 18, 1927.
W. A. RIDDELL
1,645,929
PHOTOGRAPHIC SHUTTER
Filed Oct. 27, 1924
2 Sheets-Sheet 1
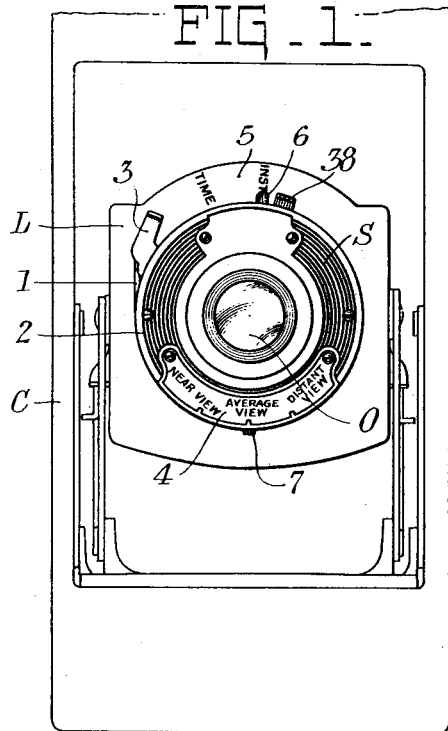
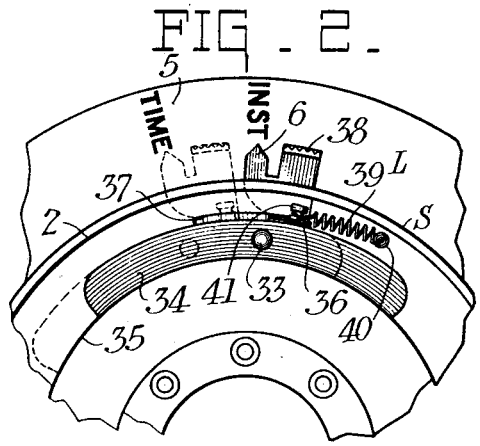
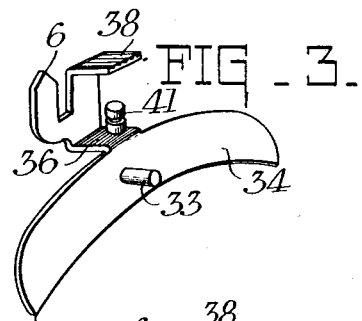
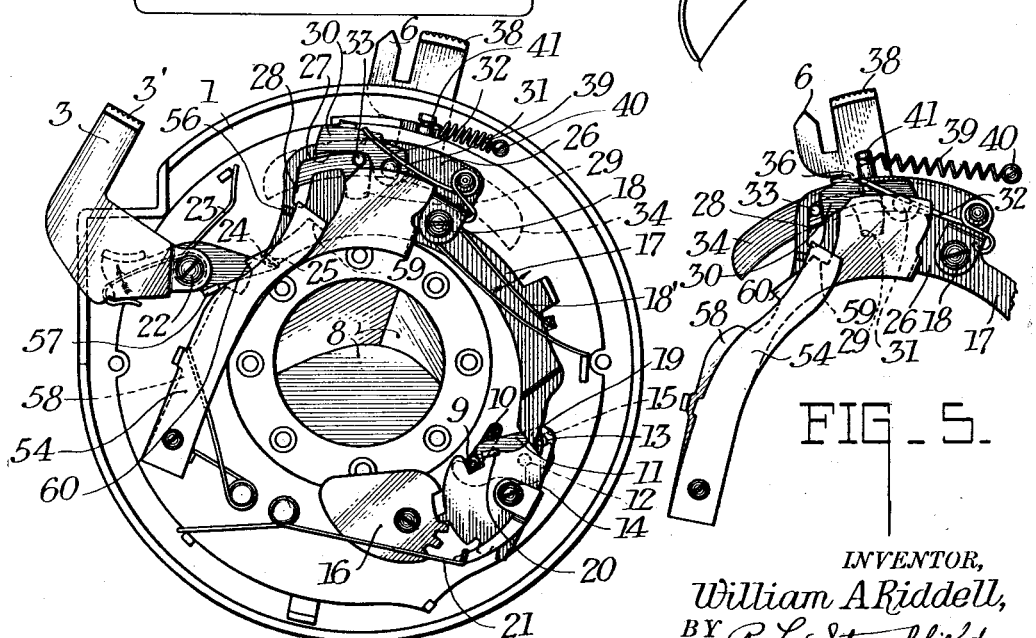
INVENTOR,
William A. Riddell,
BY R. L. Stinchfield
Donald H. Stewart,
ATTORNEYS.

Oct. 18, 1927.
W. A. RIDDELL
1,645,929
PHOTOGRAPHIC SHUTTER
Filed Oct. 27, 1924   2 Sheets-Sheet 2
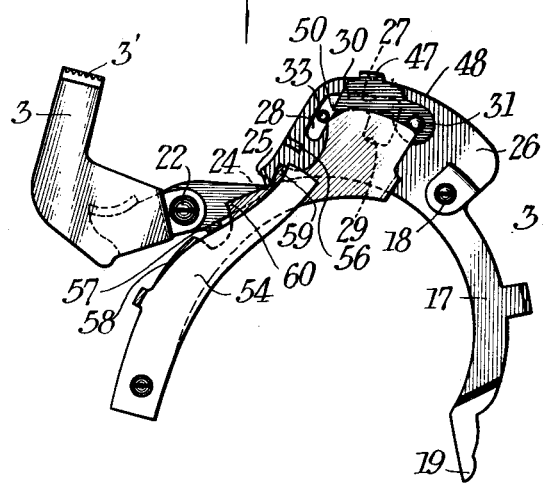
FIG_6.
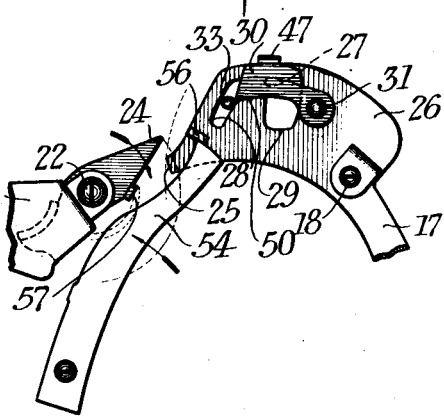
FIG_7.
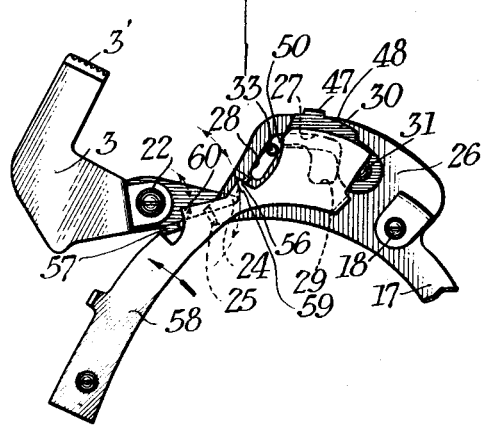
FIG_8.
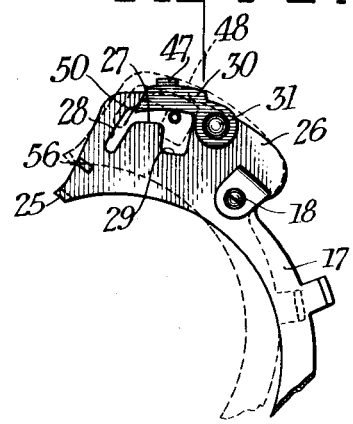
FIG_9.
INVENTOR,
William A. Riddell,
BY
ATTORNEYS.

Patented Oct. 18, 1927.

1,645,929

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

Application filed October 27, 1924. Serial No. 746,200.

This invention relates to photography, and more particularly to photographic shutters for cameras. One object of my invention is to provide a shutter in which provision is made for resetting the shutter for the most used exposure after the least used exposure is made. Another object is to provide a shutter with simple mechanism for automatically moving the setting lever to the most used exposure. Another object is to provide a shutter which must be manually set each time a time exposure is made, and other objects will appear from the following specification, the novel features being pointed out in the claims at the end thereof.

Photographic shutters for use on hand cameras are usually equipped with shutters generally controlled by two levers movable over two scales; one for controlling the duration of the exposure, and the other for controlling the shutter diaphragm. The scale indicating the duration of the exposure may be divided simply into two divisions for time and instantaneous exposures, or time, bulb, and instantaneous exposures, and the latter division on the more expensive shutters is generally subdivided into a plurality of automatically controlled exposures of relatively short duration.

The great majority of exposures are of the instantaneous class, that is, of short duration. For this reason it frequently happens that an operator forgets to return the setting lever to the instantaneous position after making one of the infrequently used time exposures, and following exposures of the instantaneous type are spoiled by the incorrect shutter setting. This invention relates to overcoming this difficulty by automatically returning the setting lever to the most used position after exposures at each of the least used settings are made.

Coming now to the drawings wherein like reference characters denote like parts throughout.

Fig. 1 is a front elevation of a typical shutter constructed in accordance with and illustrating one form of my invention;

Fig. 2 is a fragmentary front elevation of the time slide;

Fig. 3 is a perspective view of the time slide removed from a shutter;

Fig. 4 is a front elevation of the shutter shown in Figure 1 with the cover plate removed, and Figs. 5, 6, 7, 8 and 9 are elevations of certain shutter parts in positions illustrating their relative relations for different exposures and parts of exposures.

In the present embodiment of my invention, I have applied it to a simple shutter of the type shown in my co-pending application, Serial No. 612,218, filed January 12, 1923, for photographic shutters. It is obvious that my invention is also applicable to all shutters having time and instantaneous exposure settings. Only such parts of the shutter as are necessary for a complete understanding of my invention will be herein described, as all other details will be found complete in the application above mentioned.

In Fig. 1 the shutter S is mounted upon the lens board L of a typical camera C. O is an objective of any preferred type.

The shutter comprises a shutter casing 1 containing the shutter operating parts covered by the annular cover plate 2. An exposure lever 3 is for actuating the shutter, and scales 4 and 5 together with pointers 6 and 7 are for setting the shutter parts for the desired exposure.

The shutter blades 8 are opened and closed by an oscillating ring from which a pin 9 extends up through a slot 10 in the usual manner. Pin 9 may be moved by plate 11 swung upon stud 12 through the pin 13 of swinging plate 14 which passes into slot 15 of plate 11.

The retarding member 16 cooperates with plate 14 as described in my above mentioned application.

A master member 17 swinging upon stud 18 moves plate 14 when the point 19 strikes lug 20 moving the plate 14 against spring 21 which returns plate 14 to the position shown (Fig. 4) after an exposure is made. The master member 17 normally lies in the full line position of Fig. 4, being held so by the main driving spring 18'. This spring is set and tripped by exposure lever 3. By pressing handle 3' lever 3 turns on stud 22 against the action of spring 23 causing point 24 to move lug 25 of master member 17 upwardly until lug 25 slips off, at which time spring 18', having been tensioned is permitted to return the master member to its initial position. Point 24 slides under lug 25 when returning to the full line position of Fig. 4.

So far the mechanism functions like the shutter parts of my co-pending application above referred to. The master member 17 in the present shutter is provided with a base portion 26 having a slot 27 connecting the time slot 28 and the instantaneous slot 29. A latch 30 is pivoted at 31 to base 26 and is pressed by spring 32 towards pin 33. This pin is mounted on slide 34 adapted to move upon the shutter flange 35 and having a bent arm 36 passing out through slot 37 in the shutter wall and terminating in a pointer 6 and an operating handle 38. The setting lever is best shown in Fig. 3. A spring 39 fastened to screw 40 of the shutter casing and pin 41 of arm 36 normally holds slide 34 as shown in Figs. 2 and 4, in which position pin 33 lies in the instantaneous slot 29. When the master member is oscillated upon its stud 18 as above described, it will not strike pin 33 as best shown in Fig. 9. An instantaneous exposure can be made when the pin is in this position, and pointer 6 so indicates on scale 5.

If, however, a time exposure is to be made, the setting member 38 is moved until pointer 6 indicates "Time" on scale 5. As shown in Figs. 2 and 5 pin 33 is moved through slot 27 to a position at the upper end of the time slot 28 where it is held by latch 30, as is shown in Fig. 5. By pressing trigger 3 point 24 moves lug 25 of the master member turning it upon stud 18 until pin 33 leaves latch 30 which is moved with the master member 17 and, as slot 28 is concentric with stud 18 the slot moves about the pin which remains stationary. When the point 24 slips off lug 25 (Fig. 7), lever 54 catches on lug 56 carried by master member 17 holding it in position to retain the blades 8 fully opened. As point 24 moves in a reverse direction lug 57 cams lever 54 from lug 56 and this lug is then caught by arm 58 upon projection 59. (See Figs. 6, 7, 8 and 9.) The slight movement of master member 17 during this movement is not sufficient to close the shutter blades. A second downward pressure on trigger 3 causes lug 57 to strike projection 60 camming arm 58 away from lug 56 permitting the master member to return to its initial position closing the shutter blades.

It should be noted that latch 30 is normally held against pin 33 by a spring 32, its movement being limited, however, by the lug 47 which extends down from the latch so as to strike the top edge 48 of the master member 17. When the pin 33 is moved to the left, Fig. 5, it is caught by the latch and held between the latch and the outer edge of slot 28. When the master member is moved for opening the shutter blades, spring 39 moves pin 33 to the opposite side of slot 28, and while this movement is very slight, it is sufficient to cause pin 33 to strike the point 50 of latch 30 a glancing blow (as the master member returns from the dashed line position toward the full line position Fig. 9) thereby raising the latch against the light spring 32, and, when slot 27 comes into alignment with pin 33 it immediately snaps across to its normal or instantaneous exposure position above slot 29, as is shown in Fig. 4. Thus the shutter is automatically returned to position for instantaneous exposures immediately after the time exposure has been made, and it is necessary to again set the shutter for time before another time exposure can be made.

The operation of this shutter is as follows: a single pressure on lever 3 makes an instantaneous exposure. For making a time exposure the setting member is moved to the left by grip 38. (Fig. 1) bringing pointer 6 opposite Time. Exposure lever 3 is pressed once to open the shutter leaves, and then a second time to close the shutter leaves, and as this second movement takes place, pointer 6 snaps back to its normal or instantaneous setting.

It is to be understood that the above described shutter is by way of illustration only for my device may be applied to a variety of different types of shutters. I contemplate, as within the scope of my invention all such embodiments of my invention as may come within the scope of the following claims.

Having thus described my invention what I claim as new and desire to secure by Letters Patent is:

1. In a photographic shutter, the combination with mechanism adapted to produce a plurality of mechanically and manually timed exposures, of a setting member adapted to be moved to adjust the mechanism for the variously timed exposures, means for moving said member for said adjustment, and a controlling connection between said mechanism and means actuated by said mechanism.

2. In a photographic shutter, the combination with mechanism adapted to produce a plurality of mechanically and manually timed exposures, said member adapted to be moved to adjust the mechanism of the variously timed exposures, means for moving the setting member manually and means including a connection to said mechanism for moving the setting member mechanically under control of said mechanism.

3. In a photographic shutter, the combination with mechanism adapted to produce a plurality of mechanically and manually timed exposures, of a setting member adapted to be moved to adjust the mechanism for the variously timed exposures, a trigger for releasing the shutter mechanism to make an exposure, and means associated with the mechanism including a connection to said mechanism adapted to move the setting member under control of said mechanism when said mechanism is caused to function through actuating the trigger.

4. In a photographic shutter, the combination with mechanism adapted to produce a plurality of mechanically and manually timed different exposures, of a setting member interconnected with the mechanism adjustable to a plurality of positions for setting said mechanism for the variously timed exposures, and means including a connection to said mechanism for automatically moving the setting member, said means being under control of said mechanism.

5. In a photographic shutter, the combination with mechanism adapted to produce a plurality of mechanically and manually timed exposures, of a setting member interconnected with the mechanism and adjustable to a plurality of positions there being one position for each of the plurality of differently timed exposures, and means including a connection with said mechanism adapted to automatically move the setting member to a predetermined one of the plurality of settings under control of said mechanism.

6. In a photographic shutter, the combination with mechanism adapted to produce a plurality of mechanically and manually timed exposures, of a setting member interconnected with the mechanism and adapted to be moved for adjusting the shutter mechanism for each exposure, means for manually adjusting the setting member for the various exposures, and means including a connection with the mechanism acting on the setting member adapted to alter the adjustment of the setting member.

7. In a photographic shutter, the combination with mechanism adapted to produce a plurality of mechanically and manually timed exposures, of a setting member adapted to be moved for adjusting the shutter mechanism for each exposure, connections between the setting member and said mechanism, means for manually adjusting the setting member for the various exposures, and means including a connection with shutter mechanism acting on the setting member adapted to alter the adjustment thereof, said means being under the control of the shutter mechanism.

8. In a photographic shutter, the combination with mechanism adapted to produce a plurality of mechanically and manually timed exposures, of a setting member interconnected with said mechanism for each exposure, means for manually adjusting the setting member for the various exposures, means including a connection with said mechanism for moving the setting member to a normal position at one of the plurality of settings, said second named means being adapted to move the setting member to its normal position.

9. In a photographic shutter, the combination with mechanism adapted to produce a plurality of mechanically and manually timed exposures, of a setting member movable to a plurality of positions for selecting the desired exposure, connections between the setting lever and the mechanism, a spring actuated mechanism including a connection with said mechanism adapted to return the setting member to a predetermined position after each exposure made at settings other than that at said predetermined position.

10. In a photographic shutter, the combination with mechanism adapted to produce a plurality of different exposures, of a setting member movable to a plurality of positions for selecting the desired exposure, a spring for moving the setting member to a normal position at one end of the plurality of positions, and mechanism adapted to hold the setting member against the action of the spring away from the normal setting, connection between the two mechanisms through which the second mentioned mechanism may be rendered inoperative by making an exposure, whereby the spring may move the setting lever to its normal position.

11. In a photographic shutter, the combination of a blade moving mechanism adapted to give manually controlled time and mechanically controlled instantaneous exposures, of a movable member adapted to be moved to set the mechanism for the different exposures, and connections between the movable member and the mechanism, and a spring actuated means including a connection with said mechanism for automatically moving the member to the instantaneous exposure position after the timed exposure has been made.

12. In a photographic shutter, the combination of a shutter mechanism for obtaining different mechanically and manually controlled exposures including a time exposure, a setting lever interconnected with setting mechanism adaped to be moved for obtaining differently timed exposures, a trigger cooperating with the mechanism for actuating the shutter, and a member interconnected with the shutter mechanism and under control of the trigger for moving the setting lever from its time exposure position as a time exposure is completed.

13. In a photographic shutter, the combination with a shutter mechanism for obtaining different exposures, of a setting member for adjusting the mechanism for the various exposures, a trigger for actuating the shutter mechanism, and connections between the trigger and the setting member including a source of power for moving the setting member to a predetermined setting after the trigger has been pressed to actuate the shutter mechanism.

14. In a photographic shutter, the combination with a shutter mechanism for obtaining different exposures, of a setting member for adjusting the mechanism for the various exposures, a trigger for actuating the shutter mechanism, and operable connections between the shutter setting member and the trigger whereby the setting of the setting member may be altered by movement of the trigger.

15. In a photographic shutter, the combination with a shutter mechanism for obtaining different exposures, of a setting member for adjusting the mechanism for the various exposures, a source of power connected to the setting member adapted to move it to one of its various settings, and means for rendering said source of power inoperative, said means being controlled by the shutter mechanism.

16. In a photographic shutter, the combination with a shutter mechanism for obtaining different exposures, of a setting member for adjusting the mechanism for the various exposures, a spring adapted to move the setting member, and a latch for holding the setting member against the spring pressure, connections between the latch and the shutter mechanism for releasing the latch when an exposure is made.

17. In a photographic shutter, the combination with mechanism for making a plurality of exposures including time and instantaneous exposures, a member for setting the shutter for the various exposures a spring adapted to normally hold the setting member in position for instantaneous exposures, and means associated with the shutter mechanism for rendering the spring inoperative until after the mechanism for making a time exposure has functioned, said spring being then adapted to return the setting lever to its normal position.

18. In a photographic shutter, the combination with mechanism for making time and instantaneous exposures, a setting member for controlling the exposure produced by the shutter mechanism, a spring for normally holding the setting lever at the desired setting, and a latch adapted to hold the setting lever against the action of the spring, means for moving the latch to effect the release of the setting lever at each actuation of the shutter to produce an exposure.

19. In a photographic shutter, the combination with shutter mechanism adapted to make different exposures including time and instantaneous exposures, a controlling lever for setting the shutter mechanism for time or instantaneous exposures, a spring for normally holding the setting lever at the instantaneous exposure position, means associated with the shutter mechanism for temporarily holding the setting lever at the time position, a trigger for making the exposures, said trigger being adapted to trip the temporary holding means for the setting lever as a time exposure is made, whereby the spring is permitted to return the setting lever to its instantaneous exposure position.

20. In a photographic shutter, the combination with mechanism adapted to produce different mechanically and manually controlled exposures, of a setting member adjusted to position the mechanism for the differently controlled exposures, connections between the setting lever and said mechanism, means for manually setting the setting member, spring actuated mechanism including a connection with said mechanism cooperating with the setting member adapted to move this member, whereby the setting member must be manually moved against the spring actuated mechanism before certain of the different exposures may be made.

21. In a photographic shutter, the combination with a mechanism adapted to produce different mechanically and manually timed exposures, of a setting lever adjustable to position the mechanism of the differently timed exposures, connections between the setting lever and said mechanism, means for manually setting the setting member, said connections between the setting lever and shutter mechanism controlling the setting lever so that this lever may be manually set for certain exposures but not manually set for all exposures.

22. In a photographic shutter, the combination with mechanism adapted to produce a plurality of mechanically and manually timed exposures, of a setting member interconnected to said mechanism adjustable to position said mechanism for the differently timed exposures, means for manually adjusting the setting member and means including a connection with said mechanism for automatically adjusting the setting member.

23. In a photographic shutter, the combination with mechanism adapted to produce a plurality of mechanically and manually timed exposures, of a setting member adjustable to position the mechanism for the differently timed exposures, connections between said setting member and said mechanism, means for manually adjusting the setting member and means including a connection between the setting member and said mechanism for automatically adjusting the setting member, the automatic means being adapted to move the setting member after each manual adjustment.

24. In a photographic shutter, the combination with mechanism adapted to produce a plurality of mechanically and manually timed exposures, of a setting member adjustable to position the mechanism for the differently timed exposures, and movable in two directions, connections between the setting member and said mechanism, a manual control for moving the setting member in one direction, and a power operated device including a connection with said mechanism for moving the setting member in the opposite direction.

25. In a photographic shutter, the combination with mechanism adapted to produce a plurality of mechanically and manually timed exposures, of a setting member interconnected with said mechanism adjustable to position the mechanism on the differently timed exposures, said setting member being movable in two directions, a manual control for moving the setting member in one direction, a power operated device for moving the setting member in the opposite direction, connections between said power operated device and said mechanism, said power operating device moving the setting member after each manual adjustment thereof.

26. In a photographic shutter, the combination with mechanism adapted to produce a plurality of exposures, of a setting member adjustable to position the mechanism for different exposures, and movable in two directions, a manual control for moving the setting member in one direction, a detent for holding the manually set member, connections between the detent and shutter mechanism for releasing the detent after each exposure of the shutter mechanism, and automatic means for moving the setting member from the manually set position when the detent is released.

Signed at Rochester, New York, this 23rd day of October, 1924.

WILLIAM A. RIDDELL.